A. J. INGERSOLL.
DUST CAP FOR AIR VALVES FOR AUTO TIRES.
APPLICATION FILED FEB. 11, 1916.

1,207,408.

Patented Dec. 5, 1916.

WITNESSES
H. T. Dietersch
L. Donville

INVENTOR
Andrew J. Ingersoll
BY Diedersheim & Fairbanks
ATTORNEYS

UNITED STATES PATENT OFFICE.

ANDREW J. INGERSOLL, OF BRIDGETON, NEW JERSEY.

DUST-CAP FOR AIR-VALVES FOR AUTO-TIRES.

1,207,408.  Specification of Letters Patent.  Patented Dec. 5, 1916.

Application filed February 11, 1916. Serial No. 77,582.

*To all whom it may concern:*

Be it known that I, ANDREW J. INGERSOLL, a citizen of the United States, residing at Bridgeton, in the county of Cumberland, State of New Jersey, have invented new and useful Dust-Caps for Air-Valves of Auto-Tires, of which the following is a specification.

My invention relates to a dust cap of what is known as the air valve of an auto-tire, and consists of a cap of novel construction whereby it may be readily fitted to and connected with the casing or body of said valve, and retain its position, and may be conveniently removed therefrom.

The invention is satisfactorily illustrated in the accompanying drawing, but the important instrumentalities thereof may be varied, as long as they are included in the scope of the claim.

Figure 1:
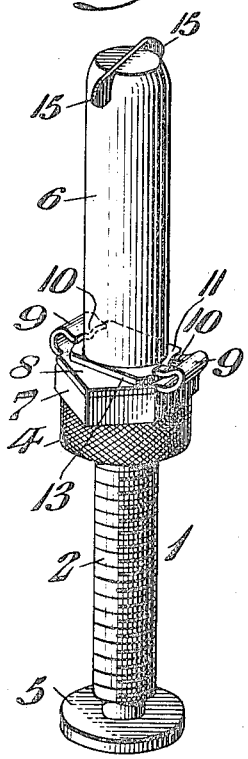
Figure 4:
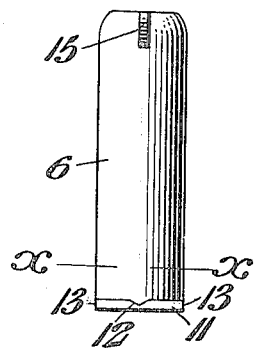
Figure 2:
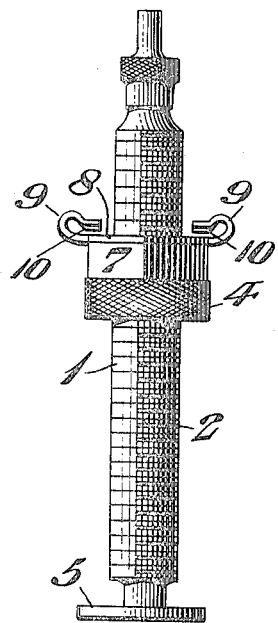
Figure 5:
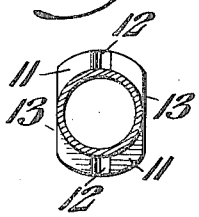
Figure 7:
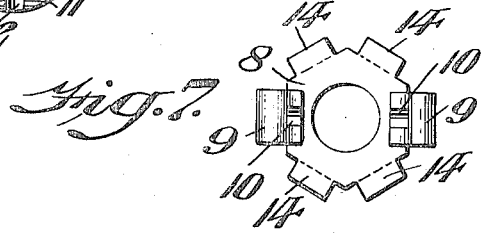
Figure 3:
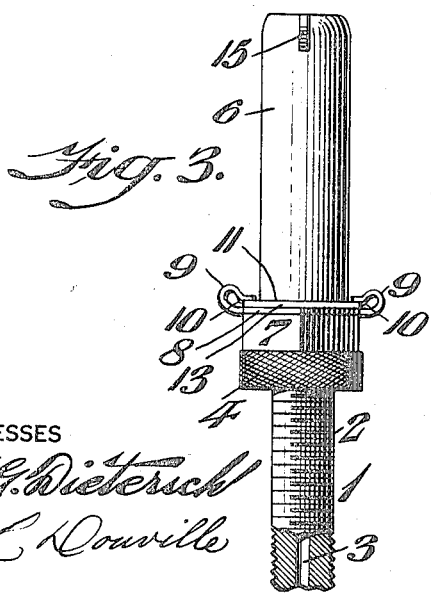
Figure 6:
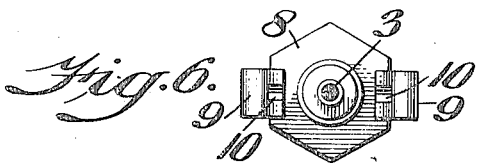

Figure 1 represents a perspective view of an air valve of the character stated having a dust cap embodying my invention applied thereto. Fig. 2 represents a side elevation of the valve, the cap proper having been removed therefrom. Fig. 3 represents a side elevation of the cap and portion of the valve. Fig. 4 represents a side elevation of the cap proper. Fig. 5 represents a horizontal section on the line x—x Fig. 4. Fig. 6 represents a top or plan view of the members shown in Fig. 2. Fig. 7 represents a top or plan view of a modification of the members shown in Fig. 6.

Similar numerals of reference indicate corresponding parts in the figures.

Referring to the drawings, 1 designates the casing or body of an air valve of an auto-tire, but as is evident, may be applied to the tire of another vehicle, said body being interiorly bored as at 3, exteriorly screw-threaded as at 2, and provided with the nut 4 and rim 5 for purpose of connection, as well known in the art.

6 designates a cap of elongated form, the same having a closed side and top, and an open bottom whereby it may be fitted on the upper portion of the casing 1, and completely close the top of the bore 3 to the atmosphere. On the casing 1 is screwed the nut 7 which may be jammed on the nut 4 or otherwise tightened thereon. Interposed on said nut 7, and fitted over the casing 1 is the collar or washer 8, on the sides of which and raised therefrom are the resilient clips 9 of somewhat hook form and overhanging inwardly the body of said collar, the upper limbs having therein depressions which form detents 10. On the lower end of the cap 6 is the outturned flange 11 in whose upper face at opposite places are the recesses 12, which are adapted to receive the detents 10 of the collar 8, it being noticed that said flanges are separated or cutaway forming opposite flat places 13, as will be hereinafter further referred to.

The operation is as follows: The cap is fitted over the casing 1 so that the flange 11 rests on the body of the collar, the cut away portions 13 of said flange permitting the latter to pass downwardly along the inner ends of the clips 9, and thus said flange may be seated on said body of the collar. Then the cap is rotated whereby the body of the flange turns and rides under the upper members of the clips 9 and raises the latter until the recesses reach the detents 10 and register therewith, when the clips drop and so return to their normal position springing the detents into said recesses, thus controlling the flange and consequently locking the cap in position on the valve. By rotating the cap with sufficient force in opposite direction the flange removes the recesses from the detents and raises the clips, and the flange continues its rotation until it clears said clips, when owing to the cut away portions 13 of the flange registering with the inner edges of the clips, the cap may be raised and so entirely displaced from the valve. While the collar 8 may be brazed or swelled on the nut 7 its sides may be formed with lips 14 which may embrace the sides of said nuts as additional fastenings for the collar. The cap is provided with a thumb and finger piece 15 for convenience of rotation of the former.

Having thus described my invention what I claim as new and desire to secure by Letters Patent, is:—

In a dust cap for an air valve, a valve casing, a collar-like member adapted to be fitted over said casing and secured thereto, a resilient clip extending from the side edge of said collar and inwardly overhanging the latter with a space between them, said clip having a detent on its under face extending downwardly therefrom, and a dust cap adapted to be fitted over said casing, said cap having on its lower end a flange which is adapted to rest on said collar and having a side cut-away, allowing the flange to pass primarily the inner end of said clip and adapting said flange next to enter the space between said clip and collar and engage said detent to raise the clip, said flange having in its upper face a recess into which said detent is adapted to spring and be lockingly seated thus locking said cap with said collar and consequently with said valve casing.

ANDREW J. INGERSOLL.

Witnesses:
JAS. L. ALLEN,
JAS. E. LOCKE.